(12) United States Patent
Kato et al.

(10) Patent No.: US 7,224,078 B2
(45) Date of Patent: May 29, 2007

(54) ELECTRIC ROTATING MACHINE FOR VEHICLE

(75) Inventors: Masaki Kato, Tokyo (JP); Hiroyuki Akita, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/296,408

(22) Filed: Dec. 8, 2005

(65) Prior Publication Data

US 2006/0125240 A1 Jun. 15, 2006

(30) Foreign Application Priority Data

Dec. 10, 2004 (JP) .............. 2004-358681

(51) Int. Cl.
*H02P 9/08* (2006.01)
*H02P 1/00* (2006.01)
*H02P 5/00* (2006.01)
*H02K 23/52* (2006.01)

(52) U.S. Cl. .............. 290/31; 290/38 R; 318/139; 322/28

(58) Field of Classification Search .......... 290/31, 290/38 R; 318/139; 322/28
See application file for complete search history.

(56) References Cited

U.S. PATENT DOCUMENTS

| 4,958,095 | A | * | 9/1990 | Uchida et al. ............ 310/59 |
| 5,650,713 | A | * | 7/1997 | Takeuchi et al. .......... 322/16 |
| 5,708,352 | A | * | 1/1998 | Umeda et al. ............ 322/28 |
| 5,726,559 | A | * | 3/1998 | Taniguchi et al. ......... 322/34 |
| 5,801,497 | A | * | 9/1998 | Shamoto et al. .......... 318/139 |
| 5,973,460 | A | * | 10/1999 | Taga et al. .............. 318/139 |

(Continued)

FOREIGN PATENT DOCUMENTS

JP 2003-225000 A 8/2003

(Continued)

*Primary Examiner*—Darren Schuberg
*Assistant Examiner*—Pedro J. Cuevas
(74) *Attorney, Agent, or Firm*—Sughrue Mion, PLLC (57) ABSTRACT

In a vehicle electric rotating machine having a power section formed of a pair of inverter modules of switching elements and diodes connected in parallel thereto, and a control circuit section that controls mentioned power section, there are separately located the control circuit section on the upstream side, and the power section on the downstream side; as well as a through hole is formed in mentioned control circuit section so that mentioned cooling air flows linearly through mentioned power section.

9 Claims, 7 Drawing Sheets

U.S. PATENT DOCUMENTS

| | | | |
|---|---|---|---|
| 5,998,976 A * | 12/1999 | Steffan | 322/10 |
| 6,278,194 B1 * | 8/2001 | Nakagawa et al. | 290/31 |
| 6,384,559 B2 * | 5/2002 | Egami | 318/500 |
| 6,445,079 B1 * | 9/2002 | Gale et al. | 290/31 |
| 6,518,736 B2 * | 2/2003 | Sasaki et al. | 322/16 |
| 6,977,475 B2 * | 12/2005 | Kuribayashi et al. | 318/140 |
| 7,057,361 B2 * | 6/2006 | Kitahata et al. | 318/139 |
| 7,157,869 B2 * | 1/2007 | Ishikawa | 318/139 |
| 2001/0022166 A1 * | 9/2001 | Yamaguchi et al. | 123/179.3 |
| 2002/0043946 A1 * | 4/2002 | Yoshimura | 318/139 |
| 2002/0070715 A1 * | 6/2002 | Sasaki et al. | 322/28 |
| 2002/0158513 A1 * | 10/2002 | Amano et al. | 307/10.6 |
| 2003/0141854 A1 * | 7/2003 | Kuribayashi et al. | 322/283 |
| 2004/0012292 A1 * | 1/2004 | Kometani et al. | 310/184 |
| 2004/0178637 A1 * | 9/2004 | Eguchi et al. | 290/40 F |
| 2005/0093494 A1 * | 5/2005 | Nagayama | 318/139 |
| 2005/0104544 A1 * | 5/2005 | Ishikawa | 318/139 |
| 2005/0237033 A1 * | 10/2005 | Shirakawa et al. | 322/28 |
| 2006/0048983 A1 * | 3/2006 | Urakabe et al. | 180/65.3 |
| 2006/0055349 A1 * | 3/2006 | Nakayama et al. | 318/254 |
| 2006/0061308 A1 * | 3/2006 | Nakayama | 318/139 |
| 2006/0066270 A1 * | 3/2006 | Kumagai et al. | 318/139 |
| 2006/0108954 A1 * | 5/2006 | Sebille et al. | 318/108 |
| 2006/0108957 A1 * | 5/2006 | Urakabe et al. | 318/139 |
| 2006/0138979 A1 * | 6/2006 | Kuribayashi et al. | 318/139 |
| 2006/0214426 A1 * | 9/2006 | Asao et al. | 290/31 |
| 2006/0279086 A1 * | 12/2006 | Kishibata et al. | 290/31 |

FOREIGN PATENT DOCUMENTS

JP     2004-156589 A     6/2004

* cited by examiner

ELECTRIC ROTATING MACHINE FOR VEHICLE

BACKGROUND OF THE INVENTION

1. Field of the Invention

The present invention relates to a belt driven-type electric rotating machine for vehicle that is connected to an engine, and to an electric rotating machine for vehicle that is provided with a control device controlling a belt driven-type electric rotating machine for vehicle.

2. Description of the Related Art

For example, the Japanese Patent Publication (unexamined) No. 156589/2004 shows an idle stop control device (see FIGS. 9–11 and descriptions in columns 0068 to 0072 thereof). This known control device includes a switching element that is directly fixed onto a substantially disc-shaped heat sink, and a circuit board having a printed wiring layer that is fixed onto the heat sink; and a control IC and the like is mounted on the circuit board. Furthermore, this heat sink has double side frames attached around the entire outer circumference and the entire inner circumference, and is fixed to the rear end outer wall of a bracket via the outer circumferential side frame. Resin is injected into a ring-shaped concave part surrounded by the inner and outer circumferential side frames of the heat sink, whereby the switching element, the circuit board, the control IC, and the like are easily protected from environmental factors such as salt or mud water, resulting in improved durability and reliability.

Moreover, in the control device, a resin cover is fixed to the bracket covering the heat sink. Thus, this control device has such a cooling system that a cooling air flowing in through an air inlet that is formed in the resin cover flows in the bracket while cooling the heat sink to cool a stator winding or a rotor winding, and is discharged from the bracket to the outside.

However, in the case where a circuit board is located in the vicinity of the heat sink to which a switching element, being a heat generation element, is fixed, a problem exists in that electronic parts of low heatproof temperature such as control IC formed on the circuit board are thermally damaged. Moreover, since electronic parts are integrally sealed with resin, heat from the switching element is likely to conduct to the circuit board through the resin causing a temperature of electronic parts on the circuit board to rise.

Further, originally, a control circuit section that is formed of electronic parts or board of low heat-resistance is susceptible to the influence of heat, and parts or board usable at high temperature are expensive. Consequently, another problem exists in high cost of the whole system.

Furthermore, since a substantially disc-shaped heat sink is utilized as the frames for plastic-sealing a switching element or a circuit board, the configuration or layout of a heat sink is restricted. As a result, a further problem exists in more difficult cooling design of a control device, resulting in a larger capacity of a heat sink.

Moreover, as to the flow of cooling air flowing in by means of a centrifugal fan, cooling air being got in through an air inlet of the resin cover flows on a substantially disc-shaped heat sink toward a center thereof, flows in the bracket through small clearances on the inner circumference side of the heat sink, and is discharged toward a radial direction from the bracket. Therefore, there is a large pressure loss in cooling air, or a large loss due to deflection of a cooling air passage, eventually resulting in worse cooling efficiency.

Further, since it is constructed such that a heavy article such as heat sink is located at a position distant from the bracket, a still further problem exists in insufficient strength against vibration, etc.

The invention was made to solve the above-described problems and proposes a structure capable of protecting a control circuit board from the defect such as electric corrosion due to environmental factors such as salt water, while improving cooling performance of a power unit, and a structure of easy assembling and high productivity.

SUMMARY OF THE INVENTION

According to the present invention, a vehicle electric rotating machine for vehicle that is driven by an electric power of a battery to start an engine at the time of start-up of the mentioned engine, and that is driven by the engine to generate an AC power after the mentioned engine has been started, the mentioned vehicle electric rotating machine includes:

a power section having plural pairs of switching elements each pair being connected in series between positive and negative terminals of the mentioned battery, and diodes connected in parallel to the mentioned switching elements respectively, and in which a connection point of the switching elements connected in series is connected to a stator winding of the mentioned electric rotating machine for vehicle; and a control circuit section that controls the mentioned power section so that an electric power of the mentioned battery is supplied to the mentioned electric rotating machine for vehicle to drive a rotor by ON/OFF control of the mentioned switching elements at the time of start-up of the mentioned engine, and an AC power, which is generated at the mentioned vehicle electric rotating machine, is rectified to a DC power with the mentioned switching element and a diode group to charge the mentioned battery and a vehicle current consumer in a normal engine speed range of the mentioned engine at the time of power generation.

In the vehicle electric rotating machine for vehicle of the mentioned construction, with respect to flow of a cooling air made by a centrifugal fan that is fixed to the mentioned rotor, the control circuit section are located on the upstream side, and the power section are located on the downstream side; and the mentioned control circuit section is provided with a through hole so that the mentioned cooling air flows linearly through the mentioned power section.

The vehicle electric rotating machine for vehicle according to the invention brings about such advantages that, due to the construction of a control device (inverter) being divided into a power section generating a large amount of heat and a control circuit section generating a small amount of heat, a heat transfer resistance is made larger, and the conduction of heat from the power section to the control circuit section is suppressed. Further, due to the location of the control circuit section upstream in a cooling air passage, a temperature of a cooling air flowing through the control circuit section is lower as compared with the case of being located downstream and, as a result, the control circuit section in which many parts of low heatproof temperature are mounted can be sufficiently cooled. Furthermore, according to this invention, since the cooling air through the control circuit section flows linearly even in the power section that is located downstream in the cooling air passage, a pressure loss is reduced, thus enabling to efficiently cool the power section.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
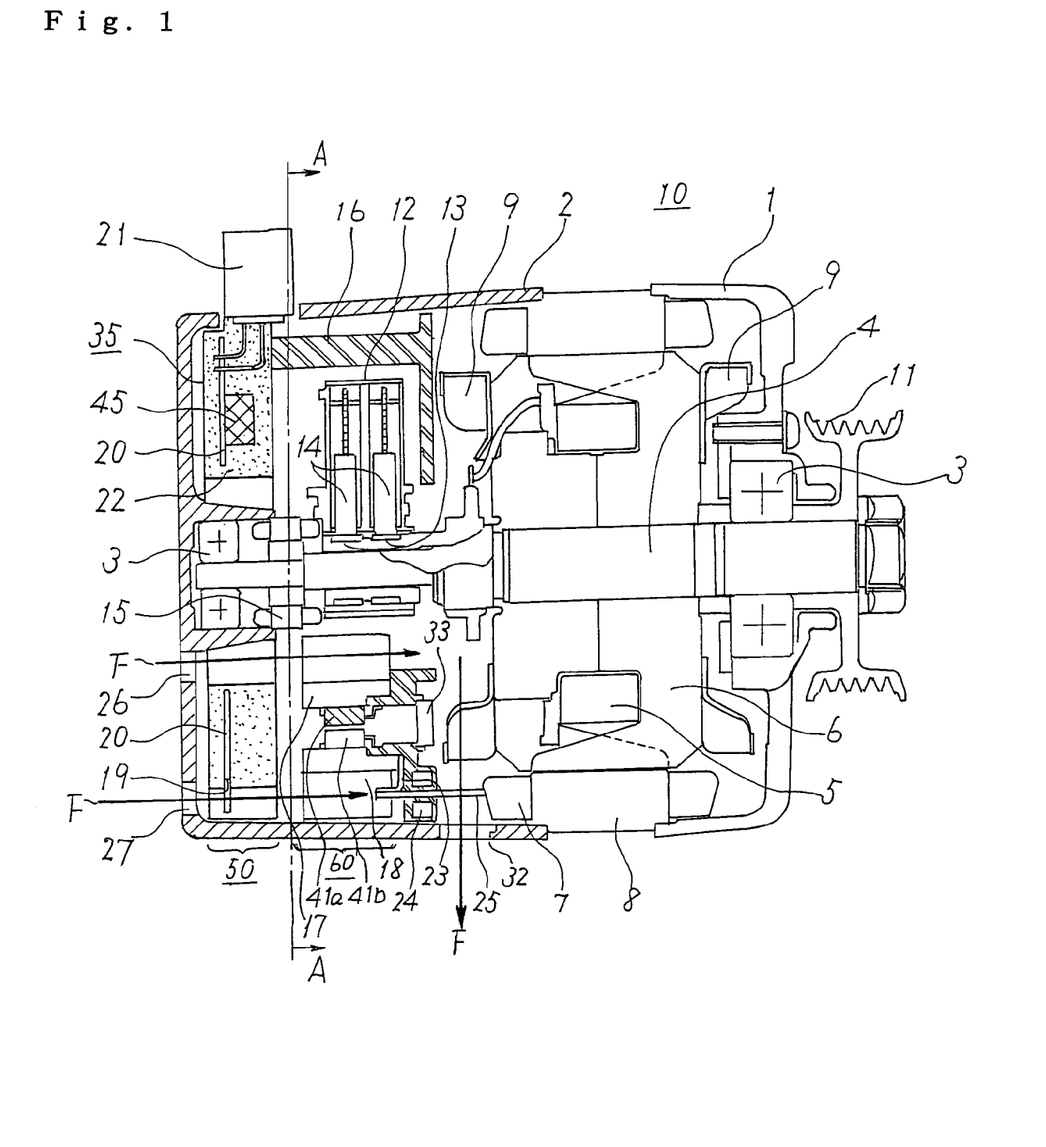
FIG. 1 is a cross sectional view showing a construction of an electric rotating machine according to a first preferred embodiment of the present invention.

With reference to FIG. 1 showing a construction of an electric rotating machine according to a first preferred embodiment of the present invention, an electric rotating machine 10 comprises: a front bracket 1 and a rear bracket 2; a shaft 4 rotatably mounted onto the mentioned brackets 1 and 2 via a supporting bearing 3; a rotor 6 that is fixed to this shaft 4, and includes a field winding 5; a stator 8 that is fixed to the mentioned brackets 1 and 2 and disposed so as to surround the rotor 6, and that includes an armature winding 7; a centrifugal fan 9 that is fixed to both axial end faces of the rotor 6, and rotates in accordance with the rotation of the rotor; a pulley 11 that is fixed to the front-side end portion of the shaft 4; a brush holder 12 attached to the rear bracket 2 so as to be located on the rear-side outer circumference of the shaft 4; a pair of brushes 14 that is disposed in the brush holder 12 so as to be slidably in contact with a pair of slip rings 13 that are mounted on the rear side of the shaft 4; and a rotational position detection sensor 15 (such as resolver) mounted on the rear-side end portion of the shaft 4. This electric rotating machine 10 is connected to a rotary shaft of an engine (not shown) via a pulley 11 and a belt (not shown).

According to this first embodiment, a power element unit 40 is disposed in a manner of being integral with or proximate to the electric rotating machine 10. That is, a plurality of power elements (switching elements as described below) 41 forming the power element unit 40, and an inner heat sink 17 and an outer heat sink 18 functioning as electrode members electrically connected to each power element 41, are mounted on a power unit support member 16 that is disposed and supported inside the rear bracket 2. A power section 60 is constituted by these power element 41, inner heat sink 17, and outer heat sink 18, and the layout of those is described in detail later with reference to FIG. 3.

On the other hand, a ring-shaped control circuit board 20 is accommodated in a case 35 along with a connector 21 for connection with a battery power supply and ECU, and a field current adjusting part 45, then sealed with an insulating resin 22, and attached to the power unit support member 16, constituting a control circuit section 50 as a whole. Signal terminals (not shown) for driving switching elements of the power section 60, or for deriving sensing outputs in an internal part of the elements, and a conductor terminal 23 that provides an electrical connection between the power section 60 and the stator winding 7 are integrally molded on the power unit support member 16. A lead wire 25 of a stator winding is connected to the conductor terminal 23 through a current detecting sensor core 24 that is molded integrally with the power unit support member 16.

As a result of such construction, the heat generation of electronic parts, which are mounted on the control circuit board 20, is dispersed and made uniform by the heat conduction of an insulating resin, thus enabling to reduce a temperature of the whole control circuit section. Further, the control circuit board 20 is plastic-sealed, so that it becomes easy to protect the control circuit board 20 from defects such as electric corrosion arising from environmental factors such as salt water, thus leading to the improvement in reliability. Furthermore, since it is possible to easily plastic-seal a control circuit board by using a case 35, an operation process comes to be simple, thus enabling to achieve improved productivity. Additionally, the mentioned case 35 can serve as a relay member of connecting electrically and mechanically the mentioned power section 60 and the mentioned control circuit board 20 together, so that it is possible to prevent the increase in the number of wiring parts, and to achieve the simplification of circuit arrangement.

Figure 2:
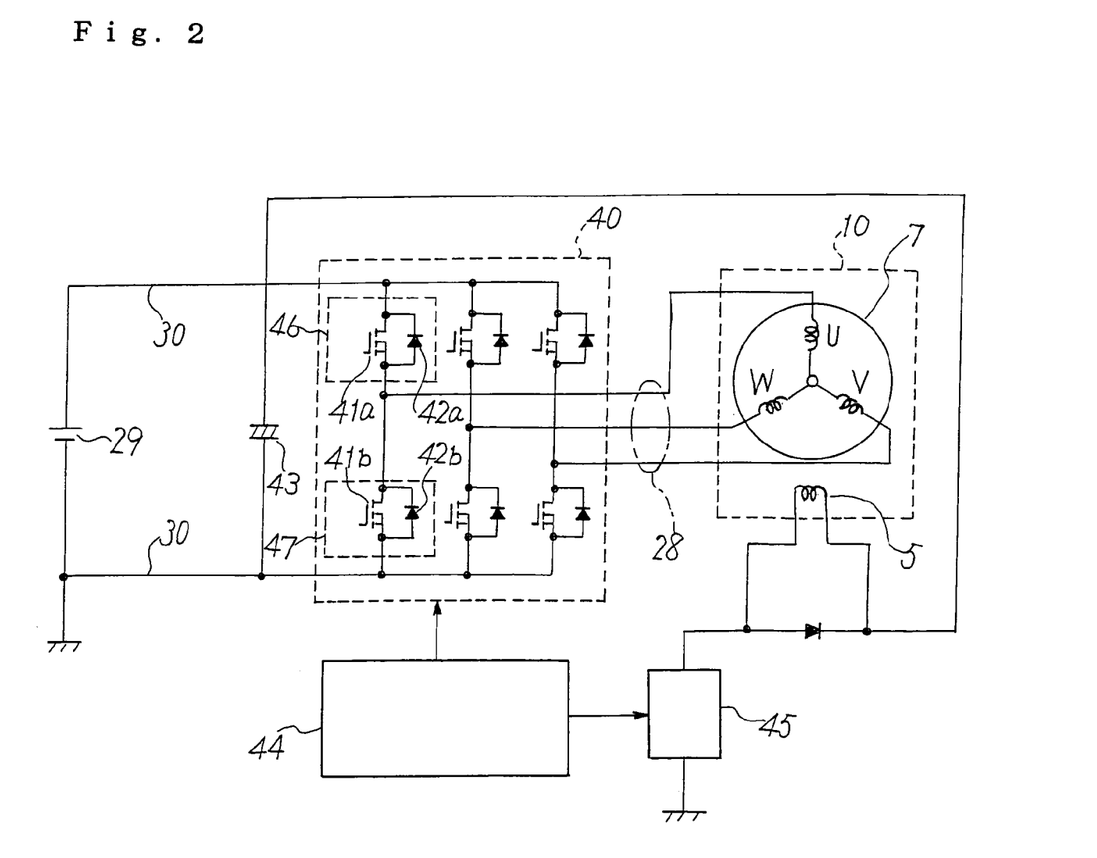
FIG. 2 is a schematic circuit diagram for explaining operation of the electric rotating machine according to the first embodiment of the invention.

FIG. 2 is a schematic circuit diagram for explaining operation of the electric rotating machine 10 provided with the power element unit 40. With reference to FIG. 2, the electric rotating machine 10 is provided with the armature winding 7 of the stator 8 and the field winding 5 of the rotor 6, and the pulley 11, which is connected to the rotor 6, is connected to a rotary shaft of an engine (not shown) through a belt. The armature winding 7 is formed by the Y-connection (star connection) of three phases (U phase, V phase and W phase) of coil. The power element unit 40 is provided with an inverter module, which is formed of switching elements (such as power transistor, MOSFET, IGBT) 41a and 41b, and diodes 42a and 42b connected in parallel to respective switching elements 41a and 41b, being a plurality of power elements, and a capacitor 43 connected in parallel to the inverter module.

One set of the inverter module is formed by the series connection of two sets of the switching element 41a and the diode 42a that form an upper arm 46, and the switching element 41b and the diode 42b that form a lower arm 47. Three such sets are connected in parallel. Ends of each phase of the Y-connection of the armature winding 7 are electrically connected to intermediate connection points between the mentioned switching element 41 of the upper arm 46 and switching element 41 of the lower arm 47, that are located in the mentioned series connection via an AC wiring 28 respectively. Furthermore, a positive electrode-side terminal and a negative electrode-side terminal of a battery 29 are electrically connected to the positive electrode side and the negative electrode side of the power element unit 40 respectively via a DC wiring 30.

In the power element unit 40, the switching operation of respective switching elements 41 is controlled by commands from the control circuit 44. The control circuit 44 controls a field current adjusting part 45 to adjust a field current flowing through the filed winding 5 of a rotor.

In the electric rotating machine 10 provided with the power element unit 40 as mentioned above, a DC power is supplied to the power element unit 40 via the DC wiring 30 from the battery 29. Further, the control circuit 44 makes the ON/OFF control of each switching element 41 of the power element unit 40, and a DC power is converted to a three-phase AC power. Then, this three-phase AC power is supplied to the armature winding 7 of the electric rotating machine 10 via the AC wiring 28.

In this manner, a rotating field is produced around the field winding 5 of the rotor to which the field current is supplied from the field current adjusting part 45, the rotor 6 is driven to rotate, and the engine is started via pulley, a belt, a crank pulley, and a clutch (ON) for the electric rotating machine.

On the other hand, when the engine is started, a rotational power of the engine is transmitted to the electric rotating machine 10 via the crank pulley, belt, and pulley for the electric rotating machine. Thus, the rotor 6 is driven to rotate, and a three-phase AC voltage is induced at the armature winding 7. Then, the control circuit 44 makes the ON/OFF control of each switching element 41, and a three-phase AC power having been induced at the armature winding 7 is converted to a DC power to charge the battery 29 and vehicle current consumer(not shown).

Referring to FIG. 1, the rear bracket 2 is further provided with vent holes 26 and 27. By the rotation of the centrifugal fan 9 of the rotor 6, wind goes through an internal part of the rear bracket 2 through an airway as indicated by the arrow F in the drawing to cool the power element 41, the inner heat sink 17, the outer heat sink 18, the control circuit 44, and the other parts. With respect to the flow of cooling air provided by the above-mentioned fan 9, the control circuit section 50 and the power section 60 are separately disposed, that is, the control circuit section 50 is disposed on the upstream side and the power section 60 is disposed on the downstream side. The power section 60 is attached to the power unit support member 16, and includes switching elements for controlling an AC power to be supplied to the stator winding 7.

For example, the electric rotating machine is arranged being divided into the upper arm 46 in which the switching element 41a on the positive terminal side of a battery is mounted on the heat sink 17 serving as an electrode, and the lower arm 47 in which the switching element 41b on the negative terminal side of the battery is mounted on the heat sink 18 serving as an electrode (see FIG. 2). The heat sinks 17 and 18 are capable of directly conducting the heat generated at the switching elements, thus enabling to efficiently cool the switching elements. Due to such arrangement, a temperature of a cooling air flowing through the control circuit section 50 is lower than that of a cooling air flowing through the power section 60, leading to improved cooling capability at the control circuit section 50.

Figure 3:
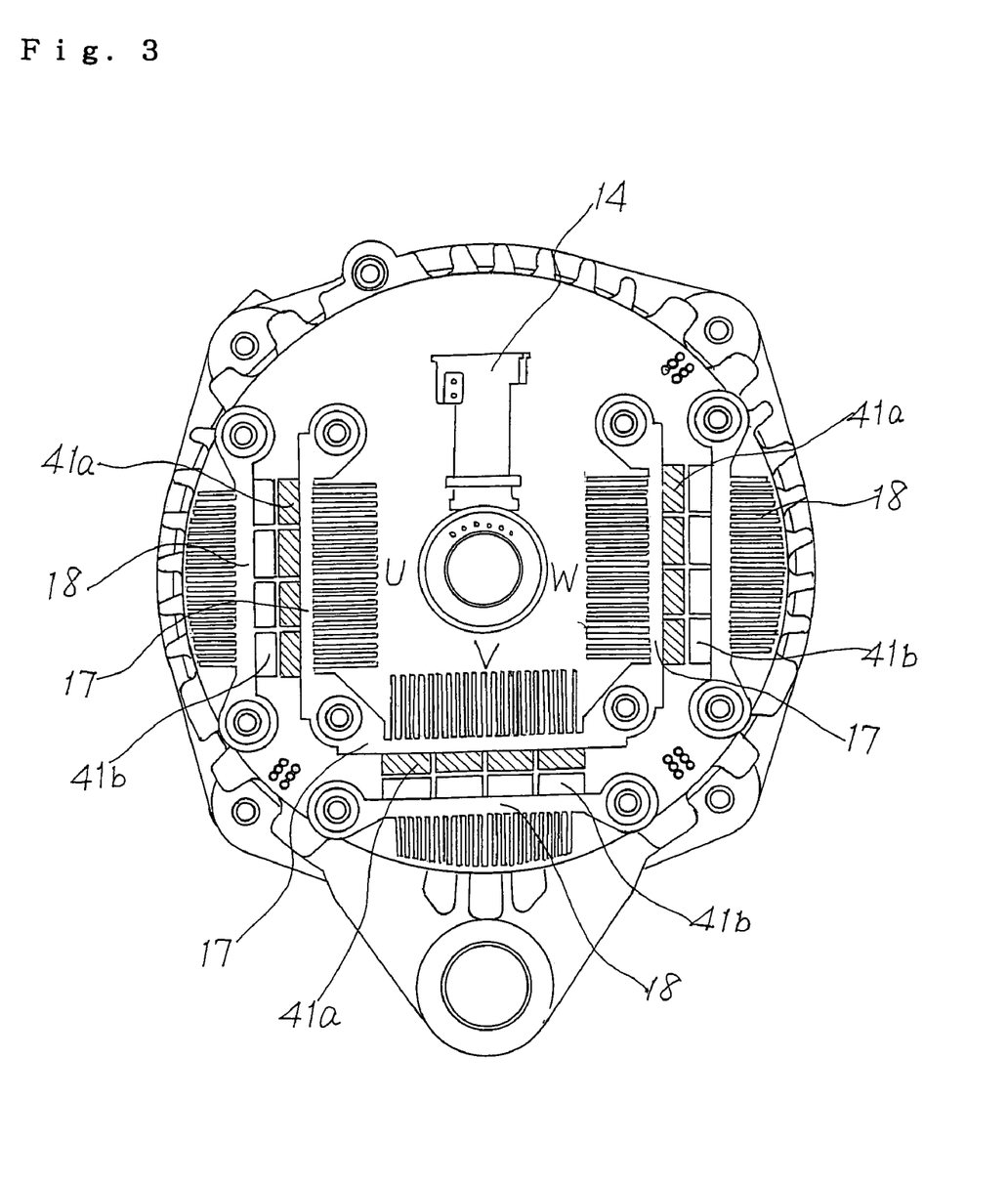
FIG. 3 is a cross sectional view taken along the line A—A of the electric rotating machine of FIG. 1.

Further, since a cooling air sucked from a through hole 27 outside the rear bracket 2 goes through an air inlet 19 provided in the control circuit section 50, and passes through the power section 60 to flow linearly, it is also possible to efficiently cool the power section 60. Thereafter, the cooling air cooled down the power section 60 is deflected in a centrifugal direction, and discharged from an outlet 32 while cooling the stator winding 7. FIG. 3 is a cross sectional view taken along the line A—A of the electric rotating machine of FIG. 1, and shows the layout of the power element unit 40.

With reference to FIG. 3, the power elements (switching elements) 41 forming the power element unit 40 is disposed being divided into threes phases of sections U, V and W. The inner heat sink 17 and the outer heat sink 18, being a pair of heat sinks, are mounted respectively in each section. Further, four switching elements 41a and 41b, being directory-type power elements, are connected in parallel to the heat sinks 17 and 18 respectively. Additionally, the heat sinks 17 and 18 are provided with respective cooling fins located in a direction opposite to each other. The inner heat sinks 17 of an upper arm having the same electric potential (the positive electrode-side electric potential of a battery) with each other form an integral whole, and the outer heat sinks 18 of the lower arm is divided into three parts so as to correspond to three phases of the stator winding 7. Furthermore, the inner heat sinks 17 may be arranged being divided into three parts in the same manner as in the outer heat sink 18.

For example, describing about the U-phase section, four switching elements 41a (hatching parts in the drawing) of the upper arm 46 corresponding to the U-phase are connected to the inner heat sink 17. Further, four switching elements 41b (blank parts in the drawing) of the lower arm 47 corresponding to the U-phase are connected to the outer heat sink 18. In addition, the mentioned four switching elements are connected in a parallel circuit. As a result of such parallel connection of plural numbers of switching elements 41, it becomes possible to make a smaller current flowing capacity per switching element, thereby enabling an inexpensive construction. Furthermore, one switching element 41 can be downsized, so that a higher degree of flexibility in layout such as being aligned in a line or being located in a square shape is assured. Thus, it is suitable for the layout in a compact space.

As described above, according to this first embodiment, a control device (inverter) is constructed being divided into a power section generating a large amount of heat and a control circuit section, whereby a heat transfer resistance comes to be larger, thus enabling to suppress the conduction of heat from the power section to the control circuit section.

Further, due to the fact that the control circuit section is located upstream in a cooling air passage, a temperature of a cooling air going through the control circuit section is low as compared with the case of being located downstream. Thus, it is possible to sufficiently cool the control circuit section onto which many parts of low heatproof temperature are mounted.

Furthermore, in the power section located downstream in the cooling air passage, since a cooling air passed through an air inlet, which is provided in the control circuit section, flows linearly, a pressure loss is reduced, thus enabling to efficiently cool the power section.

Further, as a result of the construction as mentioned above, the sensor core 24 for detecting a current is molded integrally with the above-mentioned case 35, so that it is possible to disperse heat, which is generated by eddy current flowing through the sensor core 24, by the heat conduction of the case 35, thus enabling to suppress the rise in temperature of the core 24. Further, since positioning of a sensor on the control circuit board 20 and the sensor core 24 is made only by the control circuit board 20 being integrated into the case 35, no adjustment for positioning is necessary resulting in easier assembling.

Furthermore, the conductor terminal 25, which provides a connection between an intermediate connection points of the switching elements 41 connected in series and a lead wire from the stator winding 7, is molded integrally with the mentioned case 35, and the junction thereof is sealed with an insulating resin 22 along with the above-mentioned control circuit board 20. As a result, the heat generated at the junction is dispersed by heat conduction of the sealing insulating resin, thus enabling to suppress the rise in temperature at the junction. In addition, since the junction is sealed with the resin together with the control circuit board, only one sealing process is needed, resulting in higher productivity.

Furthermore, a connector for the connection to a battery power supply or ECU is mounted on the mentioned case, so that it is possible improve earthquake-proof strength by the connector 21 being fixed to the case 35 and held thereon.

Embodiment 2

Figure 4:
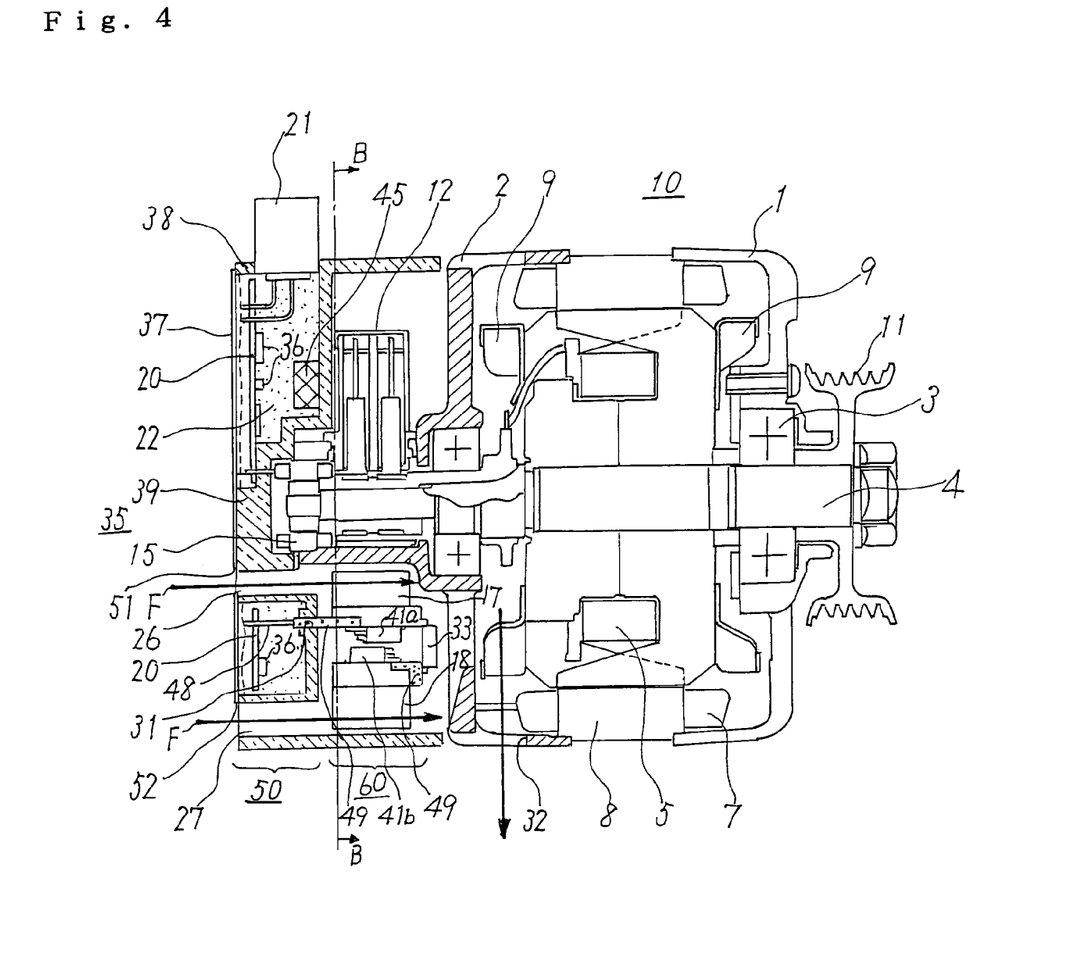
FIG. 4 is a cross sectional view showing a construction of an electric rotating machine according to a second embodiment of the invention.

FIG. 4 is a cross sectional view showing a construction of an electric rotating machine according to a second embodiment of the invention. In this second embodiment, a power element unit 60 that is formed of an inner heat sink 17, an outer heat sink 18, and a plurality of power elements 41a and 41b connected to respective heat sinks, is attached to a rear bracket 2 with a bolt (not shown) on the outside of the rear bracket 2.

On the outside of the above-mentioned power element unit 60, a case 35 including double side frames 38 and 39 around the entire outer circumference and the entire inner circumference is fixed to the rear end external wall of the mentioned bracket 2 via a bottom plate. Further, a ring-shaped control circuit board 20, on which a control circuit 44 is disposed, is fitted from outside of the mentioned case 35 through a central hole thereof to be mounted, and further the outside of the control circuit board 20 is covered with a cover 37. This case 35 is filled with a resin 22, whereby a field current adjusting part 45, a connector 21, a circuit board 20, a control IC 36, and the like that are fixed to the case 35 are sealed. Thus, it is constructed such that these parts are protected from environmental factors such as salt or mud water, and improved durability and reliability are assured.

Furthermore, a signal terminal 48 for driving the switching elements 41 or deriving sensing outputs in an internal part of the elements is connected to the control circuit board 20 with a resin mold part 49 having been insert-molded through a hole 31 in the mentioned case 35. Wiring of a smoothing capacitor 33 that is mounted in the vicinity of the switching elements 41 is also connected with the resin-molded part 49.

Vent holes 26 and 27 for making the flow of a cooling air are formed through the mentioned case 35 of the electric rotating machine. By the rotation of a centrifugal fan 9 of a rotor 6, wind goes through an airway as indicated by the arrow F in the drawing and is discharged from an outlet 32. As a result, the power elements 41, the inner heat sink 17, the outer heat sink 18, the control circuit 44, and the other parts are cooled. Further, with respect to the flow of a cooling air provided by the mentioned fan 9, the control circuit section 50 and the power section 60 are separately disposed. That is, the control circuit section 50 is disposed on the upstream side, and the power section 60 is disposed on the downstream side. Furthermore, since the cooling air having passed through an air inlet, which is formed in the control circuit section, flows linearly also in the power section 60 located downstream in the cooling air passage, a pressure loss is reduced, thus enabling to efficiently cool the power section.

Figure 5:
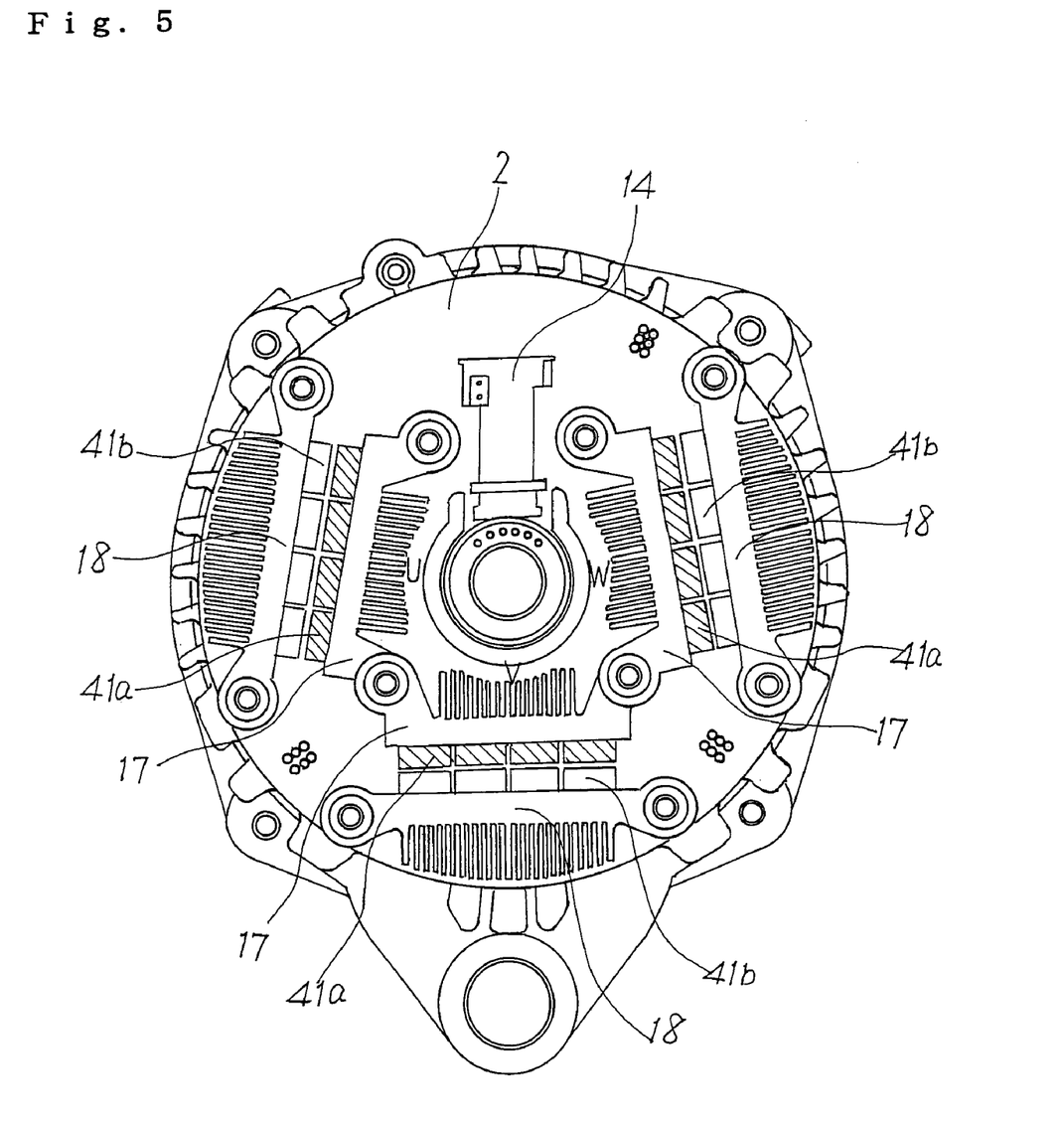
FIG. 5 is a cross sectional view taken along the line B—B of the electric rotating machine of FIG. 4.

FIG. 5 is a cross sectional view taken along the line B—B of the electric rotating machine of FIG. 3, and shows the layout of a power element unit 60.

With reference to FIG. 5, the following points are the same as in the foregoing first embodiment. These points are that the power elements 41 forming the power element unit 60 are disposed being divided into three phases of sections of U, V and W, and the inner heat sink 17 and outer heat sink 18, being a pair of heat sinks are mounted respectively at each of the sections; that the inner heat sink 17 of the upper arm has an integral structure, or is divided into three parts, and the outer heat sink 18 of the lower arm is divided into three parts; and that four switching elements 41a and 41b are connected in parallel to the heat sinks 17 and 18 respectively, and the heat sinks 17 and 18 are provided with respective cooling fins in a direction opposite to each other.

A difference from the first embodiment exists in that the heat sinks 17 and 18 resided at the sections of U and W of three phases sections are disposed inclined to the inside more than in the foregoing first embodiment with respect to the V-phase heat sinks. Such layout provides a construction of a higher level of flexibility, cooling the switching elements easier than in the foregoing first embodiment.

Figure 6:
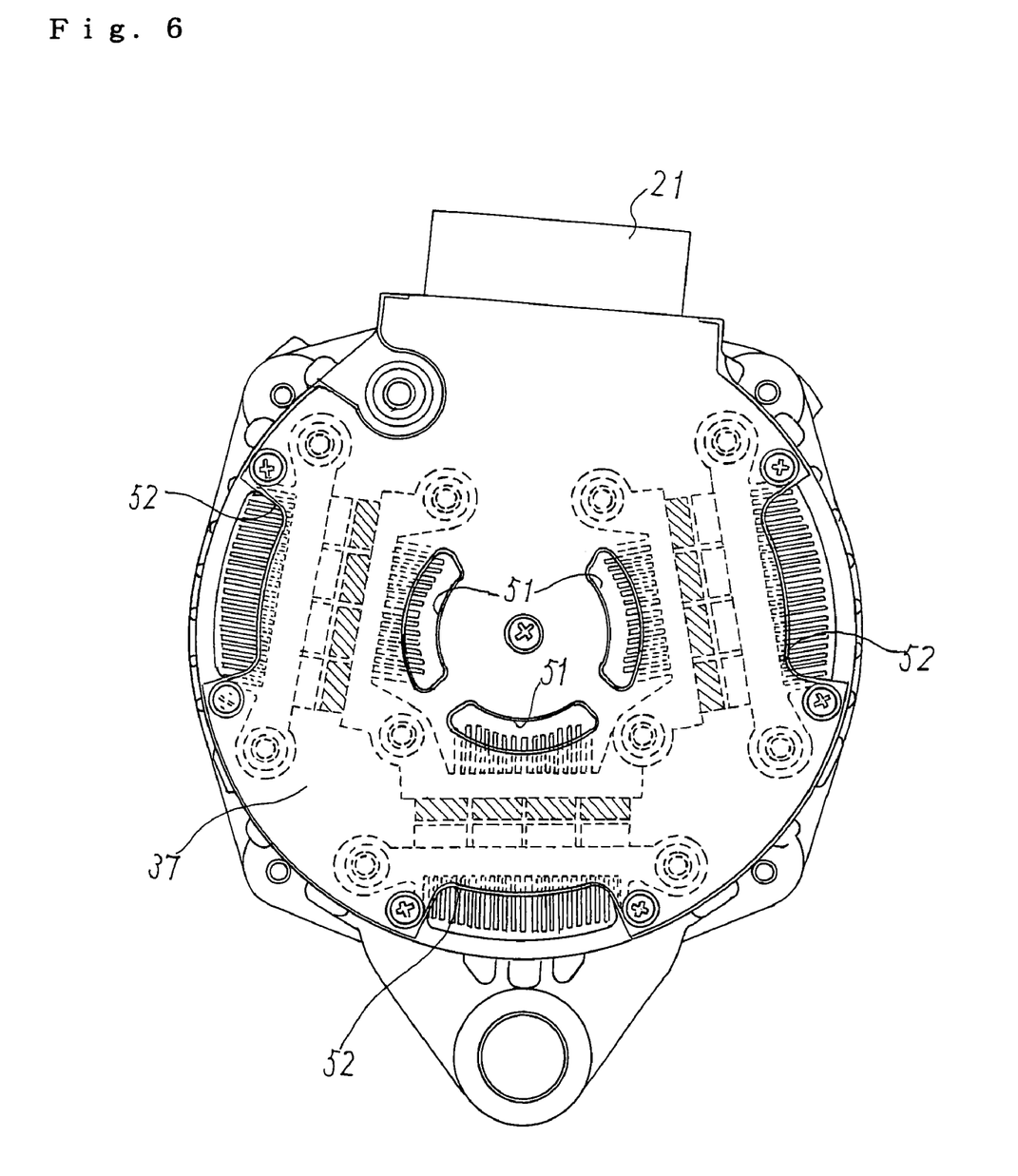
FIG. 6 is a side view taken from the rear bracket side of the electric rotating machine according to the second embodiment shown in FIG. 4.
Figure 7:
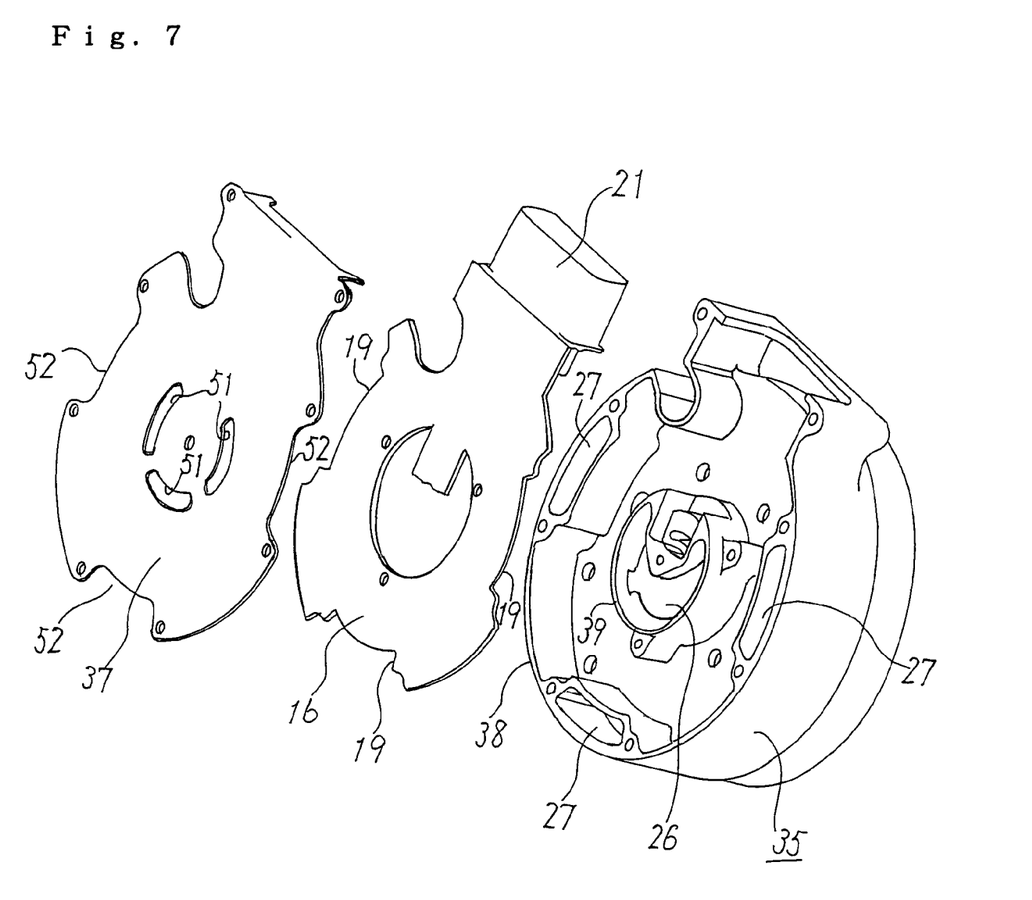
FIG. 7 is an exploded perspective view on the rear bracket side of the electric rotating machine according to the second embodiment of the invention.

FIG. 6 is a side view taken from the rear bracket side of the electric rotating machine according to the second embodiment shown in FIG. 4, and especially explains a layout relation of through holes 51, 52 provided in the cover 37, and the power element unit 60 in the internal part. Specifically, FIG. 7 shows an exploded perspective view of a case 35, a control board 16, and a cover 37 that are disposed on the rear bracket side of the mentioned electric rotating machine. As is understood from FIGS. 6 and 7, an inside vent hole 26 of the case 35 has a C-shape of which top is open. Three first through holes 51 are provided in the cover 37 at positions corresponding to the inside vent hole 26 of the mentioned case 35, and three second through holes 52 are provided at positions corresponding to outside vent holes 27 of the mentioned case 35.

Accordingly, as for the flow of a cooling air made by the above-mentioned centrifugal fan, there are two flows, one through the first through holes 51 resided on the inner side of the cover 37 and another through the second through holes 52 resided on the outer side of the cover 37. The air flows through respective first and second through holes 51 and 52 come in contact with the cooling fins of the inner heat sink 17 and the outer heat sink 18 of the power element unit 40, thereafter are deflected in a centrifugal direction, and discharged from the outlet 32 while cooling the stator winding 7.

As described above, according to the second embodiment, a control circuit section is located on the upstream side, and a power section is located on the downstream side; and through holes are provided in the mentioned control circuit section so that the mentioned cooling air flows linearly through the mentioned power section, and therefore a pressure loss is reduced, thus enabling to efficiently cool the power section.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A vehicle electric rotating machine that is driven by an electric power of a battery to start an engine at the time of start-up of said engine, as well as that is driven by the engine to generate an AC power after said engine has been started, said vehicle electric rotating machine comprising:
   a power section in which there are provided plural sets of
      a pair of switching elements connected in series
      between positive and negative terminals of said battery, and diodes connected in parallel to said switching elements respectively, and in which a connection point of the switching elements connected in series is connected to a stator winding of said vehicle electric rotating machine; and a control circuit section that controls said power section so that an electric power of said battery is supplied to said vehicle electric rotating machine to drive a rotor by ON/OFF control of said switching elements at the time of start-up of said engine, and an AC power, which is generated at said vehicle electric rotating machine, is rectified to a DC power with said switching element and diode group to charge said battery in a normal engine speed region of said engine at the time of power generation;

wherein with respect to flow of cooling air made by a centrifugal fan that is fixed to said rotor, there are separately located the control circuit section on the upstream side, and the power section on the downstream side; and the mentioned control circuit section is provided with a through hole so that the mentioned cooling air flows linearly through the mentioned power section.

2. The vehicle electric rotating machine according to claim 1, wherein said power section is located separately from said control circuit section, and said switching elements and diodes are mounted on a heat sink also serving as an electrode member.

3. The vehicle electric rotating machine according to claim 2, wherein said heat sink is divided with respect to each phase of a stator winding.

4. The vehicle electric rotating machine according to claim 1, wherein said control circuit section is contained in a case to be sealed with an insulating resin.

5. The vehicle electric rotating machine according to claim 4, wherein said case serves as a relay member providing an electrical and mechanical connection of said power section and said control circuit board.

6. The vehicle electric rotating machine according to claim 4, wherein said case is further provided with a power generation part including a field current adjusting part that controls current to be supplied to a field winding of a rotor of,said vehicle electric rotating machine.

7. The vehicle electric rotating machine according to claim 4, wherein a sensor core for detecting current is molded as an integral part in said case.

8. The vehicle electric rotating machine according to claim 4, wherein a conductor terminal that provides a connection between intermediate connection points of the switching elements of said power section, and a lead wire from the stator is molded as an integral part in said case; and a junction thereof is sealed with the insulating resin along with said control circuit board.

9. The vehicle electric rotating machine according to claim 4, wherein a connector for the connection to a battery power supply or an ECU is mounted onto said case.

* * * * *